United States Patent [19]

King

[11] Patent Number: 4,668,369

[45] Date of Patent: May 26, 1987

[54] RECIPROCATING ELECTRODE CLEANER FOR ELECTRIC FIELD LIQUID TREATER

[76] Inventor: Arthur S. King, 8021 Cherokee La., Leawood, Kans. 66206

[21] Appl. No.: 879,019

[22] Filed: Jun. 26, 1986

[51] Int. Cl.$^4$ .......... C25D 17/00; C25B 9/00; C25C 7/00

[52] U.S. Cl. .................. 204/227; 204/272; 204/279; 204/304

[58] Field of Search ........ 204/227, 272, 200, 203–204, 204/207–210, 215–217, 226, 304, 307, 279

[56] References Cited

U.S. PATENT DOCUMENTS

| | | | |
|---|---|---|---|
| 699,907 | 5/1902 | Atkins | 204/215 |
| 2,399,289 | 4/1946 | Negus | 204/227 X |
| 2,530,524 | 11/1950 | Hlavin | 204/216 |
| 2,985,568 | 5/1961 | Ziegler et al. | 204/227 X |
| 4,235,691 | 11/1980 | Loqvist | 204/272 X |

Primary Examiner—Donald R. Valentine

Attorney, Agent, or Firm—Schmidt, Johnson, Hovey & Williams

[57] ABSTRACT

A reciprocating electrode scrubber is provided which cleans the surfaces of an electrodic liquid treater having an elongated electrode mounted within a cylinderical container and having a second electrode attached to the interior surface thereof. The scrubber includes a ring-shaped body having a U-shaped cross section and includes first and second, spaced-apart, circumscribing wiping structures sized to fit in the space between the first and second electrodes; means coupled with the body for selectively, axially, and reciprocally moving the body; and means yieldably biasing the structures outwardly to hold them in contact with the electrode surfaces to be cleaned. In operation, the body reciprocates along the surfaces of the electrodes to keep them free of accumulated particles which may inhibit the electrodic action of the liquid cleaner.

5 Claims, 3 Drawing Figures

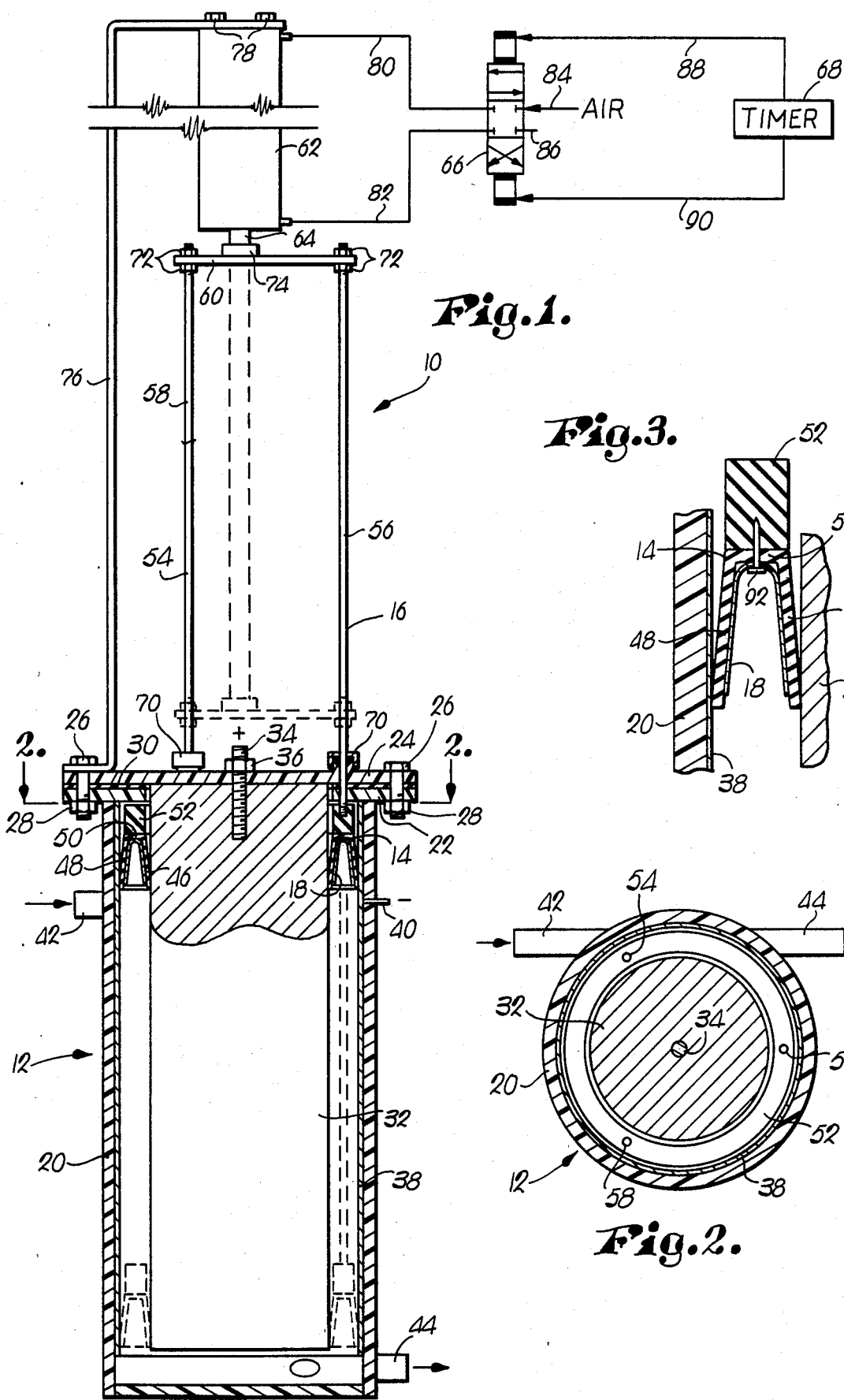

RECIPROCATING ELECTRODE CLEANER FOR ELECTRIC FIELD LIQUID TREATER

BACKGROUND OF THE INVENTION

1. Field of the Invention

This invention relates to the field of water treatment using an electrodic liquid treater to encourage floculation and precipitation of particles and dissolved solids contained therein. More particularly, this invention relates to a means for scrubbing the co-acting electrode surfaces of a liquid treater in order to maintain the surfaces relatively free of adhering particles which tend to inhibit effective electrodic action.

2. Description of the Prior Art

A number of prior art arrangements for maintaining the electrodes of a liquid treater as clean as possible during operation are disclosed in my earlier U.S. Pat. Nos. 4,236,990; 4,242,190; 4,292,163; 4,444,637; and 4,551,217 which are specifically incorporated herein by reference.

The present invention is directed to an alternative and in many respects improved means of maintaining proper electrodic action through effective electrode cleaning. That is to say, the prior art devices are adapted for applications having specific electrode configurations and arrangements and which are not necessarily effective for every electrode configuration and arrangement.

SUMMARY OF THE INVENTION

The reciprocating electrode scrubber of the present invention is adapted for use in a liquid treater having an elongated electrode mounted within a container and spaced apart from the walls thereof and in which the electrode has an outer surface to be scrubbed and the container has an interior surface to be scrubbed. The scrubber broadly includes a ring-shaped body having a U-shaped cross section sized to fit coaxially around the electrode and within the container and having first and second, spaced-apart, wiping structures; means coupled with the body for axially, reciprocally, selectively moving the body; and means coupled with the body for holding the wiping structures in slidable, wiping contact with the outer surface electrode and interior surface of the container respectively.

More particularly, the body is composed of rubber and the moving means includes a ring-shaped mounting element sized to fit coaxially around the electrode and within the container, a plurality of operating rods coupled with the mounting element, and a reciprocal piston means coupled with the rods for producing selective, axial, reciprocal shifting of the rods. Additionally, the holding means includes a ring-shaped biasing means having a U-shaped cross section coupled with the body between the wiping structures for yieldably biasing the structures outwardly into wiping contact with the surfaces to be cleaned. Preferably, the biasing means is composed of stainless steel.

BRIEF DESCRIPTION OF DRAWINGS

FIG. 1 is a combined schematic and elevational, sectional view of the scrubber attached to a liquid treater;

FIG. 2 is a view along line 2—2 of FIG. 1;

FIG. 3 is a partial cross sectional view of a portion of the scrubber.

DESCRIPTION OF THE PREFERRED EMBODIMENT

Scrubber 10 is shown in FIG. 1 attached to liquid cleaner 12 and includes scrubbing body 14, reciprocating unit 16, and biasing element 18.

Conventional liquid cleaner 12 is the type disclosed by the patents here incorporated by reference and includes cylindrical, open-topped container 20, flange 22 mounted to the open end of container 20, and container lid 24 coupled to flange 22 by bolts 26 and nuts 28. Gasket 30 is secured between lid 24 and flange 22 to provide a liquid tight seal therebetween.

Liquid cleaner 12 also includes cylindrical, carbon positive electrode 32 secured to lid 24 by stud 34 and nut 36 and tubular, stainless steel, negative electrode 38 secured to container 20 to form the interior surface thereof. Negative electrode terminal 40 is electrically coupled with negative electrode 38 and projects outwardly through the side of container 20.

Additionally, liquid cleaner 12 includes liquid inlet pipe 42 located near the top of container 20 and liquid outlet pipe 44 located near the bottom of container 20.

Scrubbing body 14 is preferably composed of rubber having a high durometer measurement and is formed to have a U-shaped cross section as best viewed in FIG. 3. Body 14 includes wiping structures 46 and 48, and base 50 together integrally forming body 14.

Reciprocating unit 16 includes mounting ring 52, equally-spaced operating rods 54, 56, and 58, Y-shaped yoke 60, air operated cylinder 62 including reciprocating piston 64, operating valve 66, and timer 68.

Mounting ring 52 has a rectangular cross section, has the same diameter as scrubbing body 14, and is sized to fit between and spaced-apart from electrodes 32 and 38. Ring 52 is preferably composed of conventional synthetic resin material resistant to chemical corrosion.

Operating rods 54–58 slidably extend through container lid 24. Three conventional packing glands 70 (only two are shown in FIG. 1) provide liquid tight seals between rods 54–58 and lid 24. One end each of rods 54–58 is threadably received in the top of mounting ring 52. The other ends of rods 54–58 are threaded, received through appropriate holes in yoke 60 and each threadably secured thereto by a pair of nuts 72 located on opposed sides of yoke 60. Integral coupling 74 secures the center of yoke 60 to one end of piston 64.

Z-shaped support bar 76 rigidly supports cylinder 62 above and axially aligned with liquid treater 12. Bolt 26 secures one end of support bar 72 to container lid 24. Two bolts 78 secure the other end of bar 72 to the outboard end of cylinder 60.

Cylinder 62 receives operating air from valve 66 via tubes 80 and 82. Electrically actuated valve 66 is supplied from a source of compressed air via supply tube 84 and exhausts air through exhaust tube 86. Timer 66 supplies operating power to valve 64 via electrical lines 88 and 90.

Stainless steel biasing element 18 is ring-shaped, has a U-shaped cross section, and is adapted to fit between wiping structures 46 and 48. A plurality of threaded fasteners 92 extend through and secure element 18 and base 48 into the lower side of mounting ring 52.

In operation, the liquid to be treated enters liquid cleaner 12 through inlet pipe 42 and exits through outlet pipe 44. The configuration of pipes 42 and 44 causes a swirling action in the space between electrodes 32 and 38 as the liquid passes through cleaner 12. Operation of cleaner 12 causes particulates and dissolved solids in the liquid stream to coagulate which often causes a particle build up on the liquid-exposed surfaces of electrodes 32 and 38. This particle buildup, upon reaching a certain level of concentration, can inhibit the effectiveness of electrodes 32 and 38.

Depending upon the rapidity of particle build-up on electrodes 32, 38, timer 68 is set to periodically activate the operating cycle of scrubber 10, for example every five minutes. At the desired time, timer 68 electrically activates valve 64 via lines 88, 90 to shift the core of valve 66 downwardly as oriented in FIG. 1 thereby connecting air inlet tube 84 with tube 80 and exhaust tube 86 with tube 82. Compressed air then enters cylinders 62 through tube 80 and causes piston 64 to move downwardly from the position shown in FIG. 1 to the position shown in phantom lines. As this movement occurs, exhaust air from cylinder 62 exits through tube 82, valve 66, and tube 86. Yoke 58 moves rods 54–58 downwardly along with ring 52, scrubbing body 14, and biasing element 18.

As scrubbing body 14 moves downwardly, wiping structures 46 and 48 wipe against the exposed surfaces of electrodes 32 and 38 to clean the electrode surfaces. The particles cleaned from the electrode surfaces move downwardly under the influence of gravity toward outlet pipe 44. Additionally, the liquid movement also moves the particles toward outlet pipe 44.

After scrubbing body 14 reaches its extended cleaning position shown in phantom lines of FIG. 1, timer 68 reverses the voltage on lines 88 and 90 which reverses the action of valve 66. The core of valve 66 then moves upwardly to connect air inlet tube 84 with tube 82 and to connect exhaust tube 86 with tube 80. The compressed air entering cylinder 62 via tube 82 causes piston 64 to move upwardly and along with it yoke 60, rods 54–58, ring 52, body 14, and element 18. Scrubber 10 is thus returned to the initial position shown in FIG. 1. At the end of five minutes, for example, as determined by timer 68, the scrubbing cycle of scrubber 10 is again initiated as described above.

As one skilled in the art will appreciate, biasing element 18 maintains wiping structures 46 and 48 in contact with the surfaces of electrodes 32, 38 even if electrode 30 decreases slightly in diameter through electrodic action or other causes. The high durometer composition of scrubbing body 14 prevents it from eroding away despite many operating cycles of scrubber 10.

The invention hereof contemplates many variations in the preferred structure herein described. For example, three operating rods are preferred but in certain applications, four rods may be needed and and in other applications only two may be required. Additionally, scrubbing body 14 might be advantageously composed of a synthetic resin material in some uses. Finally, the preferred structure uses a timer and air cylinder arrangement to cause reciprocal motion of scrubber 20; however, the present invention contemplates any of a variety of means to cause reciprocal motion including electric motors or even manual operation.

Having thus described in detail the preferred embodiment of the present invention, what is claimed as new and desired to be secured by Letters Patent is:

1. A scrubber for use in a liquid treater having an elongated electrode for creating an electric field, the electrode being mounted within a container and spaced apart from walls thereof, the electrode having an outer surface to be cleaned, the container having an interior surface to be cleaned, said scrubber comprising:
   a ring-shaped body having a U-shaped cross section and including first and second, spaced-apart, wiping structures, said body being sized to fit coaxially around the electrode and within the container;
   means coupled with said body for axially, reciprocally, selectively moving said body; and
   means coupled with said body for holding said structures in respective, slidable, wiping contact with said outer and interior surfaces whereby reciprocal movement of said structures scrubs said surfaces.

2. The scrubber as set forth in claim 1, said body being composed of rubber.

3. The scrubber as set forth in claim 1, said moving means including:
   ring-shaped mounting element sized to fit coaxially around the electrode and within the container,
   a plurality of operating rods coupled with said mounting element, and
   reciprocal piston means coupled with said rods for producing selective, axial, reciprocal shifting of said rods.

4. The scrubber as set forth in claim 1, said holding means including a ring-shaped bias means having a U-shaped cross section coupled with said body between said wiping structures for yieldably biasing said structures outwardly into said wiping contact.

5. The scrubber as set forth in claim 4, said biasing means being composed of stainless steel.

* * * * *